Feb. 26, 1935. T. LAURITZ 1,992,223
MAGAZINE CAMERA
Filed Aug. 28, 1933 6 Sheets-Sheet 1

Inventor
Thor Lauritz
By
Lyon & Lyon
Attorneys

Feb. 26, 1935.  T. LAURITZ  1,992,223
MAGAZINE CAMERA
Filed Aug. 28, 1933  6 Sheets-Sheet 2

Fig.4  Fig.5

Inventor
Thor Lauritz
By Lyon & Lyon
Attorney

Feb. 26, 1935.  T. LAURITZ  1,992,223
MAGAZINE CAMERA
Filed Aug. 28, 1933   6 Sheets-Sheet 3

Inventor
Thor Lauritz
By Lyon+Lyon
Attorneys

Feb. 26, 1935.  T. LAURITZ  1,992,223

MAGAZINE CAMERA

Filed Aug. 28, 1933   6 Sheets-Sheet 4

Inventor
Thor Lauritz
By Lyon & Lyon
Attorneys

Feb. 26, 1935.　　　　T. LAURITZ　　　1,992,223
MAGAZINE CAMERA
Filed Aug. 28, 1933　　6 Sheets-Sheet 6

Inventor
Thor Lauritz
By Lyon & Lyon
Attorneys

Patented Feb. 26, 1935

1,992,223

UNITED STATES PATENT OFFICE 1,992,223

MAGAZINE CAMERA

Thor Lauritz, West Los Angeles, Calif.

Application August 28, 1933, Serial No. 687,155

25 Claims. (Cl. 95—23)

This invention relates to photographic cameras and more particularly to film moving mechanisms and to shutter mechanisms for facilitating the taking of pictures in rapid succession.

At the present time it is quite general practice to employ thin films of celluloid, or similar flexible material, instead of the glass plates originally used for supporting the photographic emulsion. In most portable and amateur cameras, the film is in the form of a long strip which is rolled from one spool to another past the exposure window of a camera. With such film it is easy to take a series of pictures in rapid succession as the operation of shifting the film is very simple. However, roll film is not well adapted for some professional purposes because the film stock must be made so thin, in order to be sufficiently flexible to wind on a small spool, that it lacks desired stiffness, and because an entire roll of film must be exposed before any part thereof can be developed. Because of these reasons, among others, what is known as "cut-film" has come into wide use.

Cut-film is supplied in individual pieces the size of the picture to be taken, and heretofore has been handled, by most practical photographers in substantially the same manner as glass plates. Thus, the pieces of film were loaded in a dark room into individual holders which were then individually inserted into and removed from the camera before and after the taking of a picture. At best the holders are very bulky as compared to the films contained therein and the necessity of inserting the individual holders in and out of the camera adds to the operations necessary in taking a picture and increases the time required to get the camera ready for the next exposure.

In accordance with the present invention, I provide a camera or camera back which effectively handles cut-films without using separate holders for the individual films. By eliminating bulky holders, I make possible the loading into the camera of a large number of films which, by means of an ingenious mechanism, are shifted into an exposed-film magazine as they are successively exposed. The exposed-films may be removed from the magazine at any time for development without waiting until all the films in the camera have been exposed. Furthermore, since the shifting of the films is automatically performed in response to a simple mechanical movement of a single control element, films may be changed very rapidly permitting the taking of pictures in rapid succession.

I am aware of the fact that individual films have been assembled in packs but that method is not suitable for cut-film because of the stiffness of the latter. Films for use in packs must be as thin and flexible as roll film for the reason that an exposed-film is bent sharply while being pulled from the front to the rear of the pack. My camera, on the other hand, does not distort the cut-film to any extent and imposes no objectionable strains upon it.

A broad object of my invention is to provide a magazine camera for cut-film which is simple yet positive in operation, in which films may be changed rapidly by a simple mechanical movement, in which the films are protected from abrasion and maintained substantially flat at all times, and are discharged after exposure into a magazine from which they may be removed at any time.

Another object is to provide a magazine camera for cut-film having a focal plane shutter with a mechanism for automatically releasing the shutter (thereby exposing a film), shifting the exposed-film, and resetting the shutter all in response to a simple reciprocal movement of a manually controlled member.

The foregoing, together with other objects and features of the invention, will be apparent from the following detailed description which refers to the drawings in which.

Figure 1:
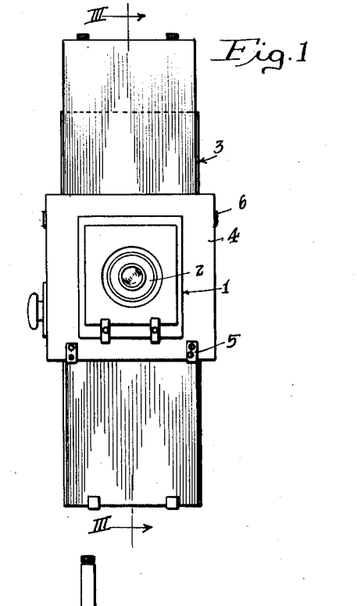
Fig. 1 is a front elevation of one form of camera embodying the invention.
Figure 2:
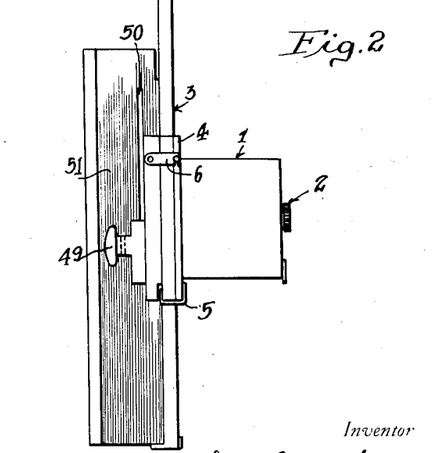
Fig. 2 is a side elevation of the camera shown in Fig. 1.

Referring to Figures 1 and 2, I have illustrated a camera comprising a light-tight box or camera body 1 having a lens 2 mounted in its front wall and having a removable back designated generally at 3, which contains a film holding and shifting mechanism and a focal plane shutter in accordance with the invention. It is to be understood that Figs. 1 and 2 are schematic in nature and that any desired type of camera body 1 may be employed and that any known focusing mechanism or view finder mechanism may be used therewith. The camera box 1 is shown provided with a rear flange 4 projecting laterally therefrom which fits against the front wall of the removable back 3 and is attachable thereto by clips 5 and catches 6.

The removable back 3, which incorporates all of the features of my invention, comprises a front wall 7 (Fig. 3) having an exposure window 8 therein, which window is adapted to register with the camera box 1. A second wall 9 is positioned back of and spaced from the front wall 7 and is also provided with an exposure window registering with the exposure window 8 in wall 7. A focal plane shutter designated generally at 10 is positioned between the walls 7 and 9. Its construction and operation will be described in detail later.

Figure 3:
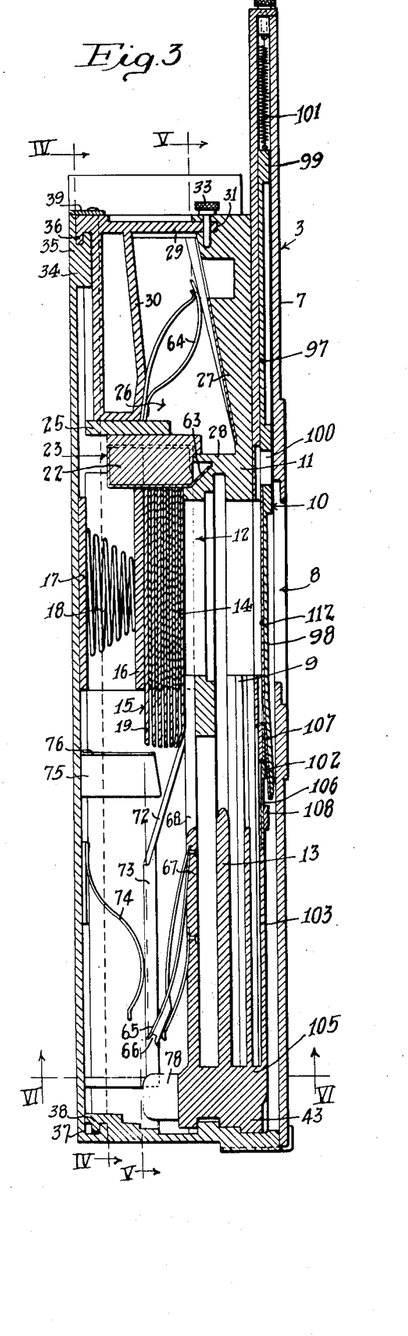
Fig. 3 is an elevational sectional view through the back of the camera shown in Figs. 1 and 2, the section being taken in the plane III—III of Fig. 1.

Positioned rearwardly and spaced from the second wall 9 is an inner wall 11 which also contains an exposure window 12 in registry with the exposure windows in walls 7 and 9. A slide 13 is positioned between walls 9 and 11 and is adapted to be moved longitudinally therebetween to cover the exposure window 12 during the operation of the device.

The rear face of the inner wall 11 surrounding the exposure window 12 is positioned in the focal plane of the camera and supports the front margins of a film positioned back thereof in exposure position. Thus the films to be exposed are stacked one behind the other against the inner wall 11 juxtaposed to the exposure window 12, as clearly shown in Fig. 3. The front film 14 rests against the margins of the window 12 and is maintained in position thereagainst by pressure exerted on the rear of the film stack, designated generally at 15, by a rear pressure plate 16, which is compressed against the rear of the stack 15 by a spiral spring 18 bearing against a plate 17 secured to the side walls of the camera.

To prevent light to which the front film 14 is exposed from reaching and fogging the film back thereof and to facilitate the discharge of the exposed films, successive films in the stack 15 are separated by spacers 19. These spacers 19 are preferably constructed of thin, flexible, opaque material, such as black celluloid, and are narrower and longer than the films.

Figure 11:
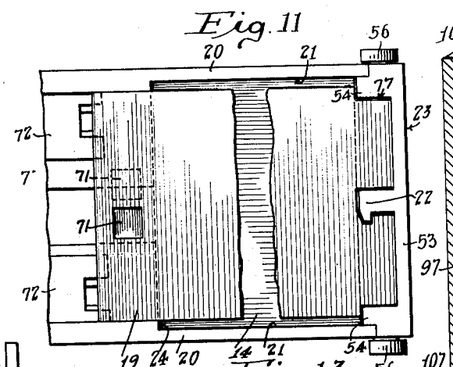
Fig. 11 is a detail plan view of the compartment containing a stack of unexposed-film separated by spacers, the top spacer being broken to show the film immediately thereunder.

Fig. 3 shows how the spacers project beyond the ends of the films in the stack 15 because of their greater length and Fig. 11 shows how the films extend laterally beyond the side edges of the spacers 19.

The walls of the compartment in which the stack 15 is located are especially shaped to maintain the films and spacers in the relative positions shown in Fig. 11. Thus the side walls are recessed as shown at 21 to receive the edges of the films and properly guide them in registration with the exposure window 12 in the inner wall 11. The portions of the side walls 20 (Fig. 11) to the left of the films in the stack are spaced apart a distance only slighty greater than the width of the spacers 19 so that the latter are centered in the stack with respect to the films.

At the opposite ends of the stack (the right end in Fig. 11) the ends of the spacers 19, which project beyond the ends of the films in the stack, are guided and secured in desired longitudinal position by a locking post 22 secured to a rearwardly movable gate 23 which serves to uncover a film discharge aperture 24 (Fig. 8) at the forward edge of an end wall 25. The operation of this gate will be described in detail later. Suffice it to say at this point that the post 22 extends through openings provided therefor in the right ends of the spacers 19, thereby securing them in alignment and preventing their discharge from the stack except under conditions to be outlined later.

Figure 7:
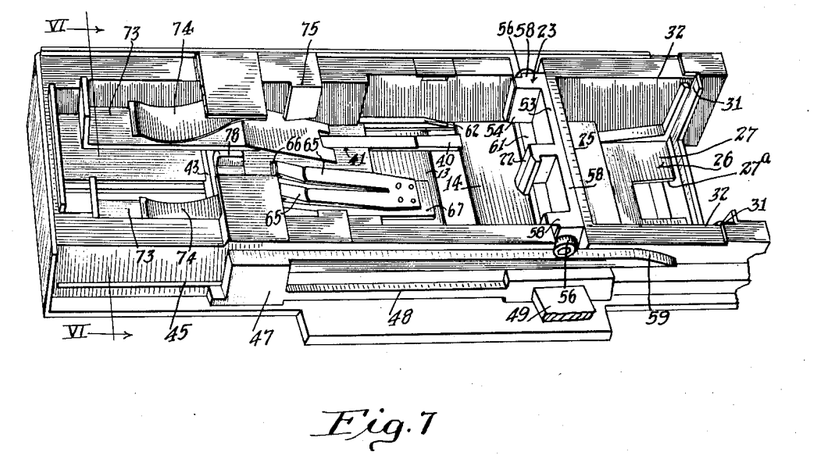
Fig. 7 is a perspective view of the camera back disclosed in Figs. 3 to 6 with the rear wall and various other removable parts removed to show the inner construction.

Separated from the stack compartment by the end wall 25 is an exposed film compartment 26 which comprises a light-tight chamber having an inclined front wall 27 and an end wall 28 which may be formed integrally with the inner wall 11 previously described and an opposite end wall 29 and rear wall 30 which may be formed as a unit removable from the main frame of the device which includes the wall 11. Thus the edges of the end wall 29 may be fitted into grooves 31 (Fig. 7) provided therefor in the side walls 32 which are extensions of the side walls 20. Grooves 31 retain the end wall 29 against longitudinal displacement and the wall, when in desired position as shown in Fig. 3, is locked against rearward displacement by a thumb pin 33. The removable magazine unit comprising the end wall 29 and rear wall 30 cooperates with a rear cover plate 34 on the camera back to lock the cover plate in position. Thus the cover plate 34 is provided with an overhanging cleat 35 which extends under a corresponding cleat 36 on the rear edge of the end wall 29. The opposite end of the cover plate 34 likewise has a reentrant edge 37 which engages in a groove in the lower end wall 38 of the camera back. After being slid into the position shown in Fig. 3, the cover plate 34 is locked against longitudinal movement by a catch 39. The front wall 27 (Fig. 7) of the exposed film compartment is recessed at its upper end, as shown at 27a, to permit an operator to grasp the end of a stack of film therein with his fingers and easily remove them.

The rear edge of the exposure window 12 lies in the focal plane of the camera and, therefore, supports the front film 14 of the stack 15 in proper position for exposure. The exposure may be made by manipulating the focal plane shutter 10 in a manner to be described later. Obviously, the focal plane shutter shown in Fig. 3 may be eliminated and any known form of shutter employed. Thus the shutter may be incorporated in the lens mounting if desired.

Figure 4:
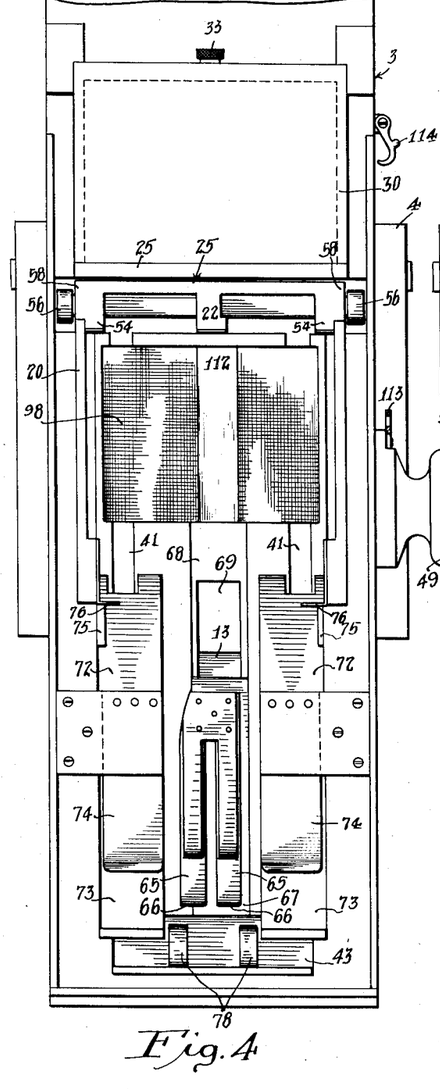
Fig. 4 is a sectional view of the camera back taken at right angles to the section of Fig. 3 and in the plane IV—IV of Fig. 3.
Figure 6:
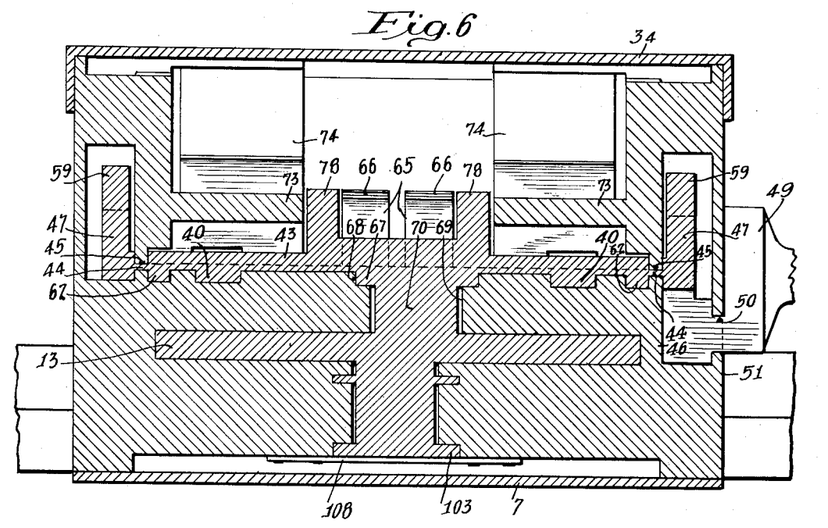
Fig. 6 is a cross section taken in the plane VI—VI of Figs. 3 and 7.
Figure 8:
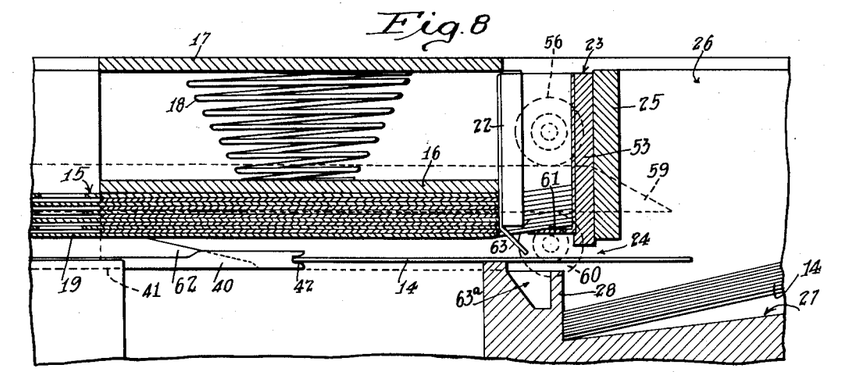
Fig. 8 is a detail section in the same plane as the section of Fig. 3, illustrating the manner in which exposed-films are discharged.

After exposure of the front film 14, the latter is removed into the exposed film compartment 26 by a pair of pusher arms 40 (Figs. 7 and 8) which are mounted for longitudinal movement in recesses 41 (Fig. 4) in the inner wall 11. These pusher arms 40 are provided with cleft ends 42, as shown in Fig. 8, to engage with the edge of the front film and, by reason of the pusher arms being mounted in the recesses 41, the cleft ends 42 lie substantially in the plane of the front film 14 when the latter is resting against the edges of the window 12. To actuate the pusher arms 40, they are connected to a cross head 43 which is in turn connected at one end (the right end of Fig. 6) by a narrow extension 44, which extends through a slit 45 in an inner side wall 46, to a block 47 (Fig. 7) which is connected by link 48 to an operating handle 49 which projects through a longitudinal slot 50 in the outer side wall 51, as shown in Fig. 2.

When the handle 49 is in normal position, as shown in Fig. 2, the cross head 43 is substantially in the bottom of the case. By shifting the handle 49 upwardly (with reference to Fig. 2) along the slot 50, the cross head 43 is shifted to a point closely adjacent the edge of the exposure window 12. Such movement of the cross head 43 moves the cleft ends of the film pusher arms 40 clear across the window 12 and into the exposed film compartment 26, as shown in dotted lines in Fig. 9, carrying the front film 14 before it into the exposed film compartment.

In order that the front film 14 may be shifted as described into the exposed film compartment, the pressure exerted on the film by the remainder of the stack must be relieved and a clear path of travel must be provided for the film. Thus, it will be observed from Fig. 3 that movement of the front film 14 into the exposed film compartment 26 is normally blocked by a gate 23, the construction of this gate being more clearly shown in Fig. 7. Thus, it comprises a plate 53 having two ribs 54 at opposite ends and the locking post 22, the inner edges of which ribs normally lie against the edges of the films in the stack 15 and function together with the recessed side walls 20 to maintain the films in alignment in the stack. The gate 23 is slidable rearwardly against the end wall 25 and is guided for sliding movement by cross heads 58 (Fig. 4) on the ends thereof which fit in slots provided therefor in the side walls 20. Rollers 56 are pivotally mounted on the ends of the cross heads 58 for engagement with lifter wedges 59 (referring to Fig. 7), which project from the blocks 47 on opposite ends of the main cross head 43 (Fig. 6). A pair of rollers 60 mounted on stationary pivots are positioned immediately below the rollers 56 on the gate 23 to take the forward thrust exerted upon the lifter wedges 59 by the rollers 56.

The foregoing structure functions as follows: Immediately upon movement of the handle 49 from its lowermost position to force the pusher arms 40 into contact with the edge of the front film 14, the lifter wedges 59 are moved between the stationary rollers 60 and the rollers 56 on the gate 23, thereby lifting the rollers 56 and the gate 23 to carry the lower edge of the gate clear of the film discharge aperture 24 in the plane of the front film 14 and simultaneously lift the ends of the spacers in the stack which rest on the shelf 61, which extends inwardly from the lowermost edge of the plate 53 on gate 23. This movement of the end of the spacers in the stack is clearly shown in Fig. 8. It will also be observed from Fig. 8 that the plate 53 has been raised clear of the film discharge aperture 24 to permit entry of the film 14 into the exposed film compartment 26.

Although the shelf 61 on gate 23 lifts one end of the stack clear of the front film 14, other means must be provided for lifting the opposite end of the stack away from the front film if the latter is to be relieved from all pressure during its movement. Such means is provided in the form of film lifter wedges 62 which are attached at one end to the cross head 43 and project therefrom in guides in the side walls 20 to a point slightly behind the ends of the film pusher arms 40. The film lifter wedges 62 are relatively narrow, being of substantially the width of the recesses 21 so that they pass in front of the next film back of the front film 14, lifting the next film and all the films and spacers in the stack back thereof, but do not engage the front spacer lying immediately back of the front film 14 because of the fact that the spacers are narrower than the films. The film lifter wedges 62 cannot lift the front film because the latter is simultaneously moved away from the stack by the pusher arms 40 which advance ahead of the wedges 62.

Referring to Fig. 8, it will be observed that the forward faces of the guides in which the lifter wedges 62 slide are depressed slightly below the rear face of wall 11, which wall limits the forward movement of the stack. Furthermore, the front faces of the lifter wedges 62 are flat and only the rear faces are tapered. Therefore the knife edge tips of the lifter wedges lie in front of the rear surface of the wall 11 and must of necessity pass in front of and rearwardly shift the next film back of the front film 14.

Springs 63 (Fig. 8) are provided on the forward inner ends of the ribs 54 and the posts 22 on gate 23 to deflect the advance edge of the film 14 forwardly into the exposed film compartment 26 as it is moved thereinto. When gate 23 closes, springs 63 disappear into especially provided pockets 63a in the front wall 11. As the film enters the compartment 26, it encounters leaf spring elements 64 secured to the rear wall 30, which deflect the film forwardly against the front wall 27. As shown in the dotted lines in Fig. 9, the cleft ends 42 of the film pusher arms 40 push the film all the way into the exposed film compartment, and upon subsequent return movement of the pusher arms 40 the trailing edge of the film is forced forwardly against the front wall 27 and clear of the discharge aperture 24 by the leaf spring 64. As other films are exposed and discharged they are deposited, each on top of the last one in the exposed-film compartment.

As a result of the foregoing operations, it will be observed that complete movement of the operating handle 49 from its position of rest to the upper end of its stroke (the direction being taken with reference to Fig. 2) simultaneously forces the gate 23 rearwardly to uncover the film discharge aperture 24 and lifts the remainder of the stack clear of the front film at the film discharge end by means of the shelf 61 extending under the ends of the spacers, lifts the next film to the front away from the front film at the opposite end of the stack by means of the film lifter wedges 62, and slides the front film 14 into the exposed film compartment by means of the film pusher arms 40.

In order to complete a cycle of operation, it is necessary to return the movable elements already described to normal position and at the same time remove the spacer which overlay the last removed film from the stack.

Figure 5:
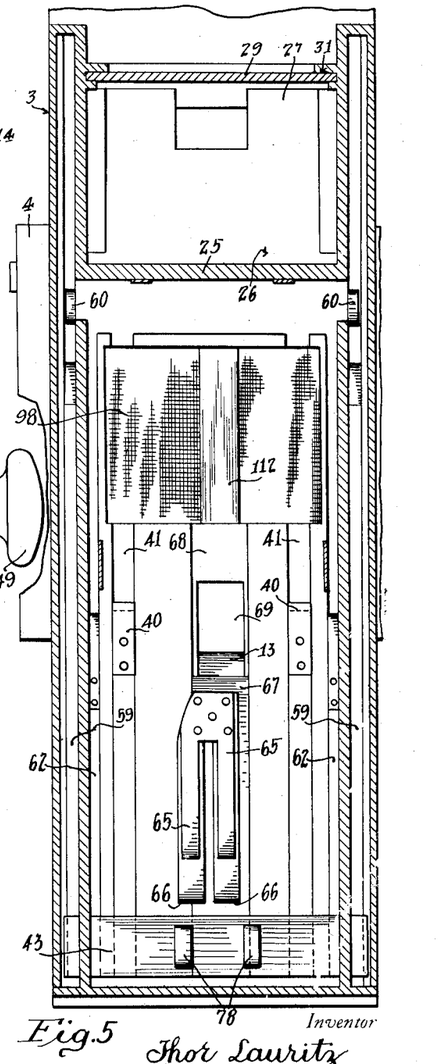
Fig. 5 is a section taken parallel to the section of Fig. 4 but in the plane V—V of Fig. 3.

The removal of this front spacer is attained by means of spring clips 65 having cleft ends 66 mounted upon a carriage 67 which is guided for longitudinal movement substantially in the plane of the inner wall 11. Thus, referring to Fig. 3, the body of the carriage 67, which carriage really comprises a relatively thin strip, slides in a recess 68 in the rear surface of the inner wall 11. The carriage 67 is secured at its lower end (the direction being taken with reference to Fig. 3) to the cross head 43 so that it reciprocates therewith. Furthermore, the inner wall 11 is cut away between the edges of the recess 68, as shown at 69, to permit the movement of that portion of the cross head (portion 70 in Fig. 6) extending forwardly from the carriage 67 to the slide 13 to permit reciprocation of the cross head. Thus in Figs. 4 and 5 the forward end of the slide 13 is visible through the cut away portion 69 of the wall 11.

Since the carriage 67 is attached to and reciprocates with the cross head 43, it moves simultaneously with the film pusher arms 40 and the tip of the carriage 67 follows the arms 40 across the exposure window 12 in front of the stack a short distance behind the advancing ends of the pusher arms 40.

Figure 9:
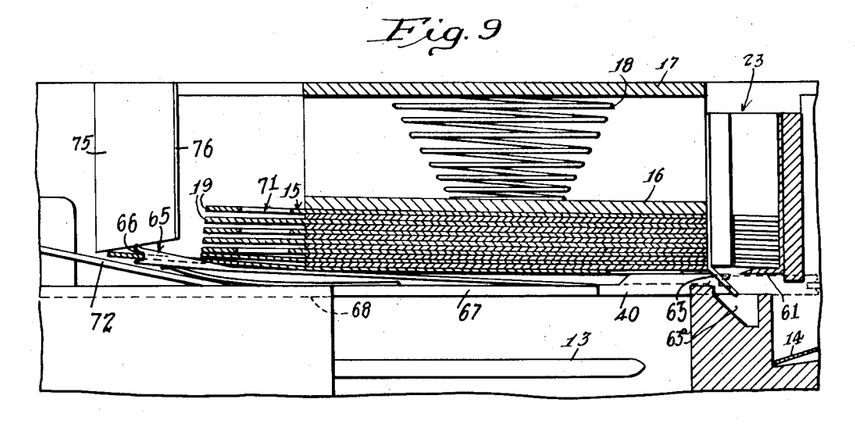
Fig. 9 is a detail section also taken in the same plane as the section of Fig. 3, illustrating the discharge of a spacer.
Figure 10:
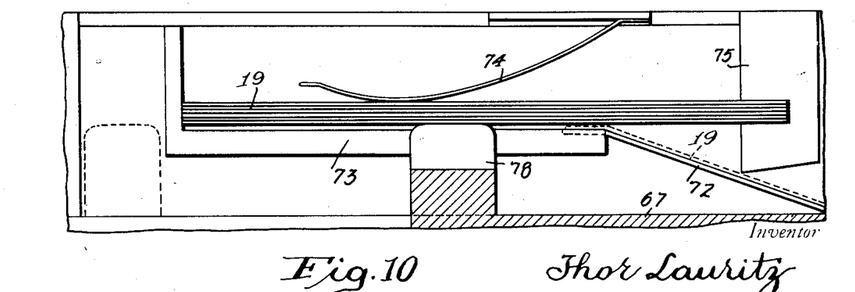
Fig. 10 is a detail section in the same plane as the section of Fig. 3, disclosing the position of discharge spacers in the magazine provided therefor and illustrating the manner in which a new spacer is introduced into the spacer magazine.

Referring now to Figure 9, when the pusher arms 40 have reached the end of their stroke (as shown in dotted lines in Fig. 9), the spring clips 65 lie immediately in front of the stack 15 with their cleft ends 66 juxtaposed to windows 71 in the end portions of the spacers which overlap the films in the stack. As shown in Fig. 11, each spacer is provided with one window 71 but the windows in successive spacers in the stack are staggered so that all of the windows in one set of alternate spacers are in registration with one of the spring clips 65 and all of the windows in the other set of alternate spacers in the stack are in registration with the other spring clip 65. Therefore, when the carriage 67 is moved into the position shown in dotted lines in Fig. 9, cleft end 66 on one of the spring clips 65 registers with the window 71 in the front spacer and, upon reverse movement of the carriage 67, the cleft end 66 engages with the edge of the window 71 in the front spacer and carries the spacer away from the stack 15. It is impossible for the cleft ends 66 of the spring clips 65 which engaged with the window 71 of the front spacer to intercept and remove more than one spacer because the window in the second spacer will be staggered with respect to the window in the front spacer and, therefore, cannot be engaged by the clips 65.

Figure 18:
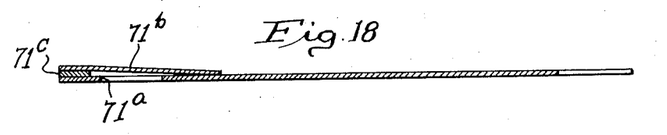
Fig. 18 is a section of a modified form of separator.

Although I prefer to employ spacers having staggered windows as described in the preceding paragraph, other forms of construction may be employed to prevent the clips 65 from engaging more than the front spacer. Thus, the spacer construction shown in Fig. 18 may be employed, in which the window 71a is covered by a short piece of material 71b, attached to the end of the spacer but slightly spaced from the rear face thereof by a narrow strip 71c. With this type of spacer the cleft ends 66 of both clips 65 can enter the window 71a (which is wider than the windows 71 in the preferred construction of spacer) of the front spacer and engage with the edge thereof, but are prevented from engaging with the window of the next spacer in the stack by the cover-piece 71b on the front spacer. Obviously the spacer shown in Fig. 18 could be constructed of a single sheet of material in which case the window 71a would merely constitute a niche in the front surface instead of an opening going all the way through. Likewise, the window 71a may be made of any desired lateral dimensions and the camera back for use therewith may have only one spring clip 65 instead of two, because the windows 71a of all the spacers in the stack can be in registration with each other.

As has been previously stated, all of the spacers are normally locked in position in the stack by the locking post 22 on the movable gate 23. However, at the time carriage 67 begins its reverse movement the gate 23 is in rearwardly displaced position, as shown in Fig. 8, in which the shelf 61 on the gate 23 is lifting the ends of the spacers in the stack 15 against the resistance of the rear pressure plate 16. This slightly bends the front spacer in the stack so that it is disengaged from the forward end of the post 22, as shown in Fig. 8. Therefore, the post 22 offers no resistance to the removal of the front spacer at this time. Furthermore, the film lifter wedges 62 have at this stage of the operation lifted the edges of the film immediately back of the front spacer so that substantially all stack pressure is removed from the front spacer during its discharge by one of the clips 65 on carriage 67.

As the spacer is moved away from the stack, it rides up on a pair of inclined tracks 72 and is thereafter carried onto a pair of tracks 73 spaced rearwardly from but extending parallel to the inner wall 11. Although the carriage 67 is limited to movement substantially in the plane of the rear surface of the inner wall 11, the spring clips 65 are sufficiently flexible to follow the spacer rearwardly in its travel along the inclined tracks 72 and the parallel tracks 73. The parallel tracks 73 are shorter than the spacers so that spacers positioned thereon project out over the inclined tracks 72. The spacers are maintained in parallel position against parallel tracks 73 by spring clips 74, clearly shown in Fig. 7. When so positioned the spacers are prevented from escaping back toward the stack 15 by cleats 75 secured to the inner surfaces of the side walls 20. These cleats extend forwardly below the plane of the parallel tracks 73, as shown in Fig. 3, but clear the inclined tracks 72 to permit passage of the front spacer from the stack thereunder during the movement previously described. The cleats 75 may also be provided with inwardly extending flanges 76 to afford a wider bearing surface against the edges of the spacers and the spacers are preferably notched at the ends opposite the windows 71, as shown at 77 in Fig. 11, these notches conforming to the outline of the ribs 54 on the gate 23 when the spacers are in the stack 15 and conforming to the outline of the cleats 75 when the spacers are in the spacer magazine resting on the parallel tracks 73.

To facilitate entry of a new spacer from the front of the stack into position on the parallel tracks 73 when there are already other spacers in the magazine, a cam 78 is provided on the carriage 67 immediately back of cross head 43 (Fig. 3) during movement of the carriage 67 from the position shown in dotted lines in Fig. 9 to the position shown in Fig. 3, this cam 78 moves slightly in advance of the forward edge of a spacer engaged in the cleft ends 66 of the one of the spring clips 65 and lifts the spacers already in position on the parallel tracks 73 slightly above the tracks to facilitate entry of the advance edge of the new spacer between the front surface of the front spacer already in the magazine and the parallel tracks 73. Of course, this cam 78 also bears against the face of the front spacer in the magazine during movement in the opposite direction but it cannot shift the spacer out of the magazine when moving in said opposite direction because the spacer is stopped by the cleats 75.

During movement of the cross head 43 to discharge the front spacer from the stack in the manner described, the film lifter wedges 62 and the wedges 59 are retracted into normal position shown in Fig. 3 so that the film in the stack in back of the spacer last removed is forced against the edges of the exposure window 12 into exposure position. After exposure of this film, it is discharged into the exposed-film compartment, the spacer that overlay it is discharged into the spacer magazine, and the next film in the stack is brought into position for exposure by merely repeating the operations previously described, which operations are accomplished by the operator's merely shifting the operating handle 49 up and down through a complete stroke.

Figure 12:
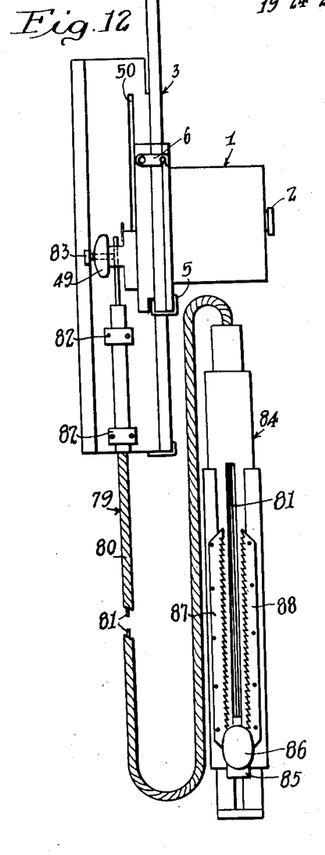
Fig. 12 is a general view showing a remote control attachment for operating the camera shown in Figs. 1 and 2.

To permit control of the camera from a remote point, a flexible control cable may be used to shift the operating handle 49. Thus, referring to Fig. 12, I have disclosed a flexible cable 79 comprising a tubular outer member 80 and an inner wire 81. The cable 79 may be of any desired length and one end of the tubular outer member 80 secured to the frame of the camera back as by clamps 82, and the corresponding end of the inner wire 81 secured to the handle 49 by passing the end of the wire through an aperture provided therefor in the handle and clamping it into position by a thumb screw 83. The opposite end of the tubular outer member 80 is preferably secured to a frame 84 and the corresponding end of the wire 81 anchored to a carriage 85 slidably mounted in guides in the frame 84. The carriage 85 may be provided with a handle 86 for the operator to grasp in reciprocating the carriage 85.

Figure 13:
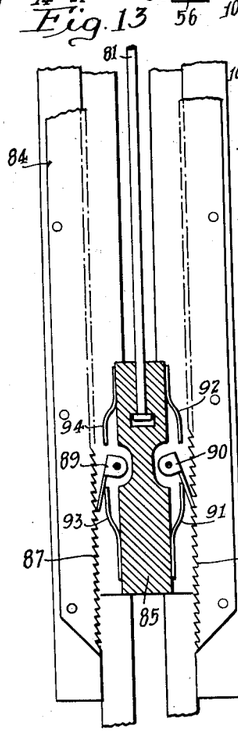
Fig. 13 is a detail view showing a mechanism for preventing reverse movement of the control mechanism.

It is desirable, although not absolutely essential, to provide some automatic means for preventing the operator from reversing direction of motion of the carriage 85 and the operating handle 49 before the completion of a full stroke. Such a mechanism is disclosed in Fig. 13, in which the edges of the frame 84 on opposite sides of the recess in which the carriage 85 reciprocates are provided with oppositely directed ratchet racks 87 and 88, respectively, and pawls 89 and 90 are pivotally mounted on the carriage 85 for engagement with the racks 87 and 88, respectively. A pair of springs 91 and 92 are provided for deflecting the pawl 90 and a pair of springs 93 and 94 for deflecting the pawl 89. It will be observed from inspection of Fig. 13 that in the position shown the pawl 90 is forced into engagement with rack 88 by spring 91 to prevent downward movement of the carriage 85. Pawl 89 is simultaneously maintained against the rack 87 by spring 93 but cannot prevent upward movement of the carriage 85 because of the direction in which pawl 89 is pointed with respect to the rack 87. However, when the carriage 85 is moved upwardly into its end position, the pawls 89 and 90 are carried past the ends of the racks 87 and 88 and are thrown outwardly by the springs 93 and 91. When the carriage 85 is thereafter moved into opposite direction, the pawls 89 and 90 are forced about their pivots by the ends of the racks 87 and 88 so that they point in the opposite direction and are maintained in engagement with their associated racks by the springs 94 and 92. In such position the pawl 89 will cooperate with rack 87 to prevent reverse (upward, with reference to Fig. 13) movement of the carriage 85, whereas the pawl 90 exercises no control on the movement of the carriage. When the carriage is moved to the end of its stroke (downwardly, with reference to Fig. 13), the pawls again escape past the ends of the racks 87 and 88 and when the carriage 85 is again moved in the opposite direction (upwardly, with respect to Fig. 13), the pawls are restored to their original position, as shown in Fig. 13.

Although the particular mechanism described for preventing reverse movement of the handle 49 has been shown mounted on the frame 84, a similar mechanism could be mounted directly on the camera back or incorporated in the camera itself.

As previously stated, the apparatus described comprises essentially a camera back for containing, supporting and shifting cut-film. It may be used in connection with practically any known form of lens and shutter construction, in which case the operation of shifting the film following each exposure is independent of the actual exposure of the film, and the latter operation being performed by manipulating a shutter independently of the film shifting mechanism just as in the conventional plate camera the operation of the shutter and the removal or changing of plates are two independent operations.

Figure 15:
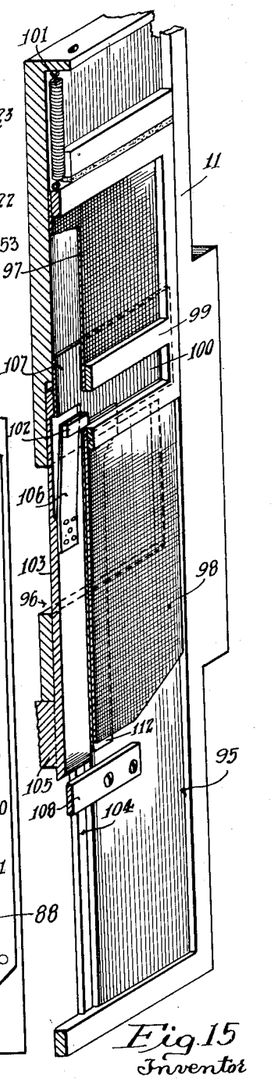
Fig. 15 is a perspective view with parts broken away showing the construction of the focal plane shutter.

It is possible, however, and in some cases desirable, to interconnect the film shifting and shutter mechanisms so that a film can be exposed and then automatically shifted in response to operation of a single actuating member. This enables an operator to take pictures in rapid succession by merely reciprocating the handle 49 through a complete cycle for each exposure. Various shutter mechanisms may be employed and connected to the reciprocable film shifting mechanism of the camera for automatic operation. A particularly effective and simple construction of focal plane shutter adapted for use in the particular camera back shown is disclosed in the sectional view of Fig. 3 and in greater detail in the perspective view of Fig. 15. In Fig. 15 the front wall 7 (Fig. 3) has been removed showing the shutter mechanism as it is mounted against the front side of the second wall 11. Thus the wall 11 is provided with a central recess 95 extending laterally substantially beyond the edges of the exposure window 96 and substantially the full length of the wall 11, in which the shutter mechanism is mounted.

The shutter proper comprises a pair of curtains 97 and 98 joined together by a frame 99 defining a transverse slit. The curtain is normally retained in uppermost position, as shown in Fig. 15, by a spiral spring 101, in which position the exposure slit 100 is above the exposure window 96. Therefore, in this position the exposure window 96 is covered by the curtain 98, thereby preventing light from entering the window and reaching a film positioned back thereof.

The shutter is set by moving it downwardly against the tension of spring 101 while blocking the slit 100 to prevent light passing therethrough and reaching the film until the slit is positioned below the window 96 and the window is covered by the curtain 97. Thereafter the exposure is made by releasing the curtain which is then retracted by spring 101 to rapidly move the frame 99 containing the exposure slit 100 across the exposure window 96.

The setting of the shutter is automatically accomplished by means of a catch 102 which is secured to a carriage 103 reciprocable in a recess 104 provided therefor in the front wall 11. This carriage 103 is connected at its lower end by a block 105 to the cross head 43. This connection is clearly disclosed in Fig. 6. The carriage 103 is shown in uppermost position (corresponding to uppermost position of the cross head 43) in Fig. 15, in which position the catch 102 is juxtaposed to the slit 100 and projects forwardly thereinto and engages with the portion of the frame 99 defining the lower edge of the slit 100. The catch 102 is supported from carriage 103 by a leaf spring element 106, which normally tends to urge the catch 102 forwardly to engage the frame 99.

Attached to the carriage 103 at its upper end is a plate 107 which, when the carriage 103 is in uppermost position, is juxtaposed to and seals the exposure slit 100. As the carriage 103 is moved downwardly from the position shown in Fig. 15, the plate 107 moved therewith since it is rigidly attached thereto and the catch 102 simultaneously carries the shutter curtain down with it. The plate 107, therefore, remains juxtaposed to the slit 100 and prevents a light passing through the slit to the film during the passage of the latter across the exposure window 96.

Figure 14:
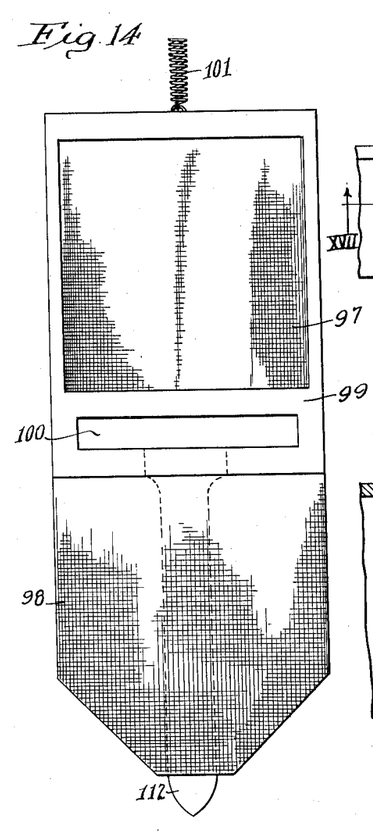
Fig. 14 is a detail plan view of the focal plane shutter curtain.

The movement described continues until the frame 99 has been carried completely below the exposure window 96 and the leaf spring 106 passes behind a release plate 108 which extends across the recess in which the carriage 103 moves. Continued downward movement of the carriage 103 carries the leaf spring 106 down behind the release plate 108 which deflects the leaf spring 106 rearwardly until it disengages with the edge of the frame 99, thereby releasing the latter and permitting the spring 101 to retract the curtain and carry the frame 99 back across exposure window 96 to expose the film in position therebehind. It will be observed that the exposure occurs during this release of the shutter because the plate 107 is rigidly attached to the carriage 103 and cannot follow the slit 100 back. The curtains 97 and 98 are preferably made of relatively thin, light-proof fabric and to protect the curtain 98 against abrasion by the catch 102 during upward movement of the latter into position to engage the frame 99, a tongue 112 of thin sheet metal may be provided in front of the curtain 98, this tongue being secured at its upper end to the frame 99. This construction is clearly disclosed in the plane view of the complete curtain assembly shown in Fig. 14.

Obviously, the length of the exposure may be varied by varying the width of the slit 100 and by varying the tension of the spring 101.

Since the carriage 103 moves up and down with the cross head 43 and the actuating handle 49, the carriage 103 moves upwardly into the position shown in Fig. 15 while the last exposed-film is being discharged into the exposed-film compartment. The shutter is set during the return movement of the cross head 43 and handle 49 simultaneously with the discharge of the spacer which overlay the last exposed-film, and is released to expose the next film in the stack at the completion of the latter movement.

The operator can perform the entire sequence of operations described in rapid succession by shifting the handle 49 through a complete cycle at the time he wishes to take a picture or he may shift the handle 49 all the way up and almost all the way down immediately following the exposure of one film, thereby discharging the exposed-film and the spacer back thereof preparatory to taking the next picture and leave the camera in that condition until he desires to expose the next film. The exposure of the next film can then be effected by a single, short, downward movement of the handle 49 to complete the cycle of operations previously begun.

The camera back described must be loaded in a dark room by removing the rear cover plate 34 and the pressure plate 16, alternately stacking cut-films and spacers into the chamber provided therefor to build up the stack 15, then reinserting the pressure plate 16 and attaching the rear cover plate 34. Likewise, the exposed-films must be removed from the exposed-film compartment 26 in a dark room.

Figure 16:
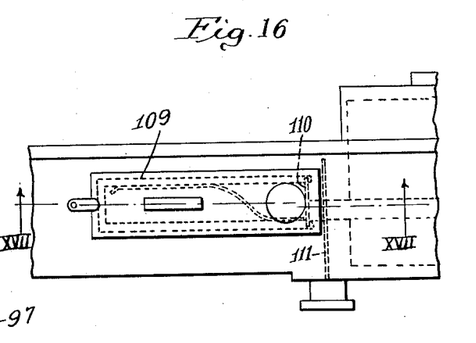
Fig. 16 is a side view of a modified form of camera construction to that shown in Figs. 1 to 14 with a removable magazine for exposed films.
Figure 17:
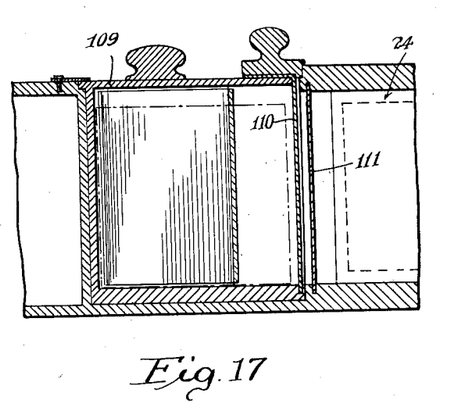
Fig. 17 is a section in the plane XVII—XVII of Fig. 16.

Since the cut-films and spacers are relatively thin, a large number of films may be loaded into the camera at one time so that it is not necessary to return the camera to a dark room very often for reloading. However, it is often desired to remove a few films from the exposed-film magazine for development before all of the films in the stack have been exposed. It is, therefore, desirable to be able to remove exposed-films without taking the entire camera into a dark room and this may be done with the use of a removable exposed-film magazine. Such a construction is shown in Figs. 16 and 17, in which the exposed-film compartment is defined by a removable box 109 which slides into and out of the camera back much the same as a drawer. The interior of the box 109 may be of substantially the same shape as the interior walls of the exposed-film compartment 26 shown in Fig. 3 and is tightly closed on all sides except the side adjacent the film discharge slit 24 (Fig. 8). On this side the box is provided with a removable slide 110, which seals the opening in the box and is inserted in position before the box is removed from the camera back. The end of the film-discharge aperture 24 in the camera back is likewise sealed by a slide 111 insertable through the rear cover plate of the camera.

In operation, the box 109 is inserted in the camera and the slides 110 and 111 withdrawn. This leaves the open end of the box 109 in communication with the film-discharge aperture 24 and it receives and retains films discharged thereinto substantially the same as the compartment 26 in the embodiment of the camera shown in Fig. 3. When it is desired to develop the films discharged into the box 109, slides 110 and 111 are inserted in position as shown in Figs. 16 and 17 and the box 109 removed to a dark room where the slide 110 is removed and the films taken out and developed.

The camera back described is very reliable in operation. This reliability is due to features of construction which have already been described in detail but their particular functions may well be emphasized at this point.

Thus it is practically impossible for the film pusher arms 40 to fail to engage with the exposed film on the front of the stack because the cleft ends 42 of the pusher arms 40 are positioned in the plane of the rear surface of the front wall 11 defining the exposure window 12 and at the time these pusher arms are moved toward the stack to displace the exposed film, that film is maintained firmly against the rear face of the wall 11 in the plane of the cleft ends 42 of the pusher arms 40 by the spring 18 and the pressure plate 16.

It is likewise impossible for any other film in the stack 15, except the front film, to be discharged from the stack because of the fact that the side margins of all these films are compressed against the pressure plate 16 by the film lifter wedges 62 at the time the film pusher arms 40 discharge the front film. At the same time the film lifter wedges 62 shift all of the films in the stack, except the front film, rearwardly so that they bear against the ribs 54 and the post 22 on gate 23 and cannot be discharged past the gate.

During the spacer discharge operation, it is impossible for more than the front spacer to be discharged from the stack, first, because the front end of the post 22 is so spaced from the shelf 61 on the gate 23 as to release only the front spacer and, second, because during removal of the front spacer all the remaining spacers are firmly gripped between the successive films in the stack, which films are compressed between the film lifter wedges 62 and the pressure plate 16. As a matter of fact, the post 22 can sometimes be dispensed with, the friction between the films and the spacers, with the exception of the front spacer, being sufficient to prevent accidental discharge of any other spacer with the front spacer.

Of course, it is impossible for any of the films to be shifted out of the stack toward the spacer magazine during the discharge of a spacer because of the fact that the films are wider than the spacers and fit within the recesses 21 in the side walls 20.

The slide 13 connected to the cross head 43 has been previously described in connection with remaining elements of the camera back but its function has not been described. It will be observed from inspection of Fig. 3 that when the carriage 43 has been moved into extreme uppermost position to discharge the front film from the stack 15 into the exposed-film compartment 26, the slide 13 is in registry with and seals the exposure window 12. By leaving the actuating handle 49 in uppermost position following the taking of the last picture of a series, the slide 13 is left in the position described sealing the exposure window 12, thereby preventing any possible leakage of light to the film stack 15 with resultant damage to the films therein. With the carriage and the slide 13 in uppermost position, the camera back may be removed from a camera without danger to the unexposed films regardless of the position of the shutter 10. Furthermore, the carriage may be locked in the uppermost position described by providing any suitable locking means for preventing return movement of the handle 49. Thus an eye 113 (Fig. 4) may be provided on the handle 49 and a hook 114 attached to the frame of the camera back in position to be engaged with the eye 113 when the handle 49 is in uppermost position.

The specific construction of camera back has been disclosed and described in detail but it is to be understood that various modifications and refinements may be made in the structure described and that the scope of the invention is to be limited only as set forth in the appended claims.

I claim:

1. In a magazine camera back for cut-films, means for supporting a stack of cut-films interspaced with thin, flexible, opaque spacers, said means comprising a front wall containing an exposure window of slightly smaller dimensions than the films, spring means for compressing the stack against said front wall, a reciprocable actuating member, means connected to said member for engaging with and shifting the front film on said stack transversely away from said stack in response to movement of said actuating member in one direction and other means also connected to said actuating member for shifting the spacer that overlay said last mentioned film transversely away from said stack in the opposite direction during return movement of said actuating member.

2. A camera back as described in claim 1 in which the means for shifting the front film from said stack comprises a pusher arm having a cleft end for engaging with the edge of the front film and mounted for longitudinal movement in a recess in said front wall whereby the cleft end lies substantially in the plane of the front film of said stack.

3. In a magazine camera back for cut-films, a frame for supporting a stack of cut-film, said frame comprising side walls spaced apart to loosely receive and guide the films and having a front wall containing an exposure window of slightly smaller dimensions than the films, spring means for compressing a stack of films within said frame against said front wall over said exposure window, an exposed-film magazine positioned to one side of and adjacent said stack holding frame, apertured wall means separating said stack and exposed film magazine, a gate normally closing said aperture, a reciprocable actuating member, means connected to said actuating member for shifting the front film from said stack through said aperture into said magazine in response to movement of said actuating member in one direction, and separate means also connected to said actuating member for opening said gate to permit passage of said film therepast during movement of said actuating member in said one direction.

4. In a magazine camera back for cut-film, a frame for supporting a stack of cut-film, said frame comprising side walls spaced apart to loosely receive the side edges of the films and having front flanges for limiting forward movement of the stack, rear spring wall means fitting loosely within said side walls for compressing a stack of films within said frame against said front flanges, said frame also comprising a first end wall having a film discharge slit therein extending the full width of said frame and a second opposite end wall having a spacer-discharge passage of width substantially less than the width of the films, means defining an exposed-film magazine beyond said film discharge slit, a plurality of spacers of thin, flexible, opaque material adapted to be positioned between successive films in said stack, said spacers being narrower than said films, reciprocable means for shifting the front film of said stack through said film discharge slit, other reciprocable means for engaging with and shifting the front spacer which overlay said last mentioned film out of said frame through the spacer-discharge passage in the opposite end wall, means operable by said reciprocable means for rearwardly shifting the side margins of the next film back of said front spacer during shifting of said spacer to release the stack pressure on the latter and simultaneously increase the pressure between the remaining films and spacers in said stack to lock the remaining spacers against accidental displacement, and means for actuating said reciprocable means in timed sequence.

5. In a magazine camera back for cut-film, a frame for supporting a stack of cut-film, said frame comprising side walls spaced apart to loosely receive the side edges of the films and having front flanges for limiting forward movement of the front film of the stack, rear spring wall means fitting loosely within said side walls for compressing a stack of films within said frame against said front flanges, said frame also comprising a first end wall having a film discharge slit therein extending the full width of said frame and a second opposite end wall having a spacer-discharge passage of width substantially less than the width of the films, means defining an exposed-film magazine beyond said film-discharge slit, a plurality of spacers of thin, flexible, opaque material adapted to be positioned between successive films in said stack, said spacers being narrower than said films, reciprocable means for shifting the front film from said stack through said film discharge slit, means for rearwardly displacing the remainder of the film stack as the front film is shifted to relieve the pressure on the front film, other reciprocable means for engaging with and shifting the spacer which overlay the last-removed film out of said frame through the spacer discharge passage in the opposite end wall, and means for actuating said reciprocable means in timed relation.

6. A camera back as described in claim 5 in which said means for rearwardly displacing the remainder of the film stack comprises elements for engaging only with the side margins of the first film back of said front spacer, which margins project beyond the edges of the narrower spacers, whereby substantially all pressure is removed from the front spacer during removal thereof.

7. A camera back as described in claim 5 in which said means for rearwardly displacing the remainder of the film stack comprises a pair of wedge-end rails slidable along the rear surfaces of said front flanges for engaging with the side margins of the first film back of the front spacer and deflecting that film and all the spacers and films back thereof rearwardly away from the front film and spacer.

8. In a magazine camera back for cut-film, means for supporting a stack of cut-film, said means comprising a front wall having a window therein defining an exposure aperture, and an end wall having an exposed-film discharge aperture therein, means at the opposite end of said stack, defining a spacer discharge passage, a spacer magazine beyond said passage, a plurality of spacers for insertion between adjacent films in said stack, each spacer comprising a thin sheet of flexible, opaque material of substantially greater length than said films, whereby said spacers when stacked with said films project beyond the films into the spacer discharge passage, film shifting means reciprocable substantially in the plane of the front film of said stack for engaging with the edge of the front film of said stack and pushing it through said film discharge aperture, other reciprocable means reciprocating substantially in the plane of said front wall in a path extending from a point in front of said stack into said spacer magazine, and cooperating means on said other reciprocable means and on the projecting ends of said spacers for producing driving engagement between said other reciprocable means and the front spacer in said stack to shift the front spacer into said spacer magazine, during movement of said other reciprocable means from said point in front of said stack into said spacer magazine, and means for actuating said two reciprocable means in timed relation.

9. A camera back as described in claim 8 in which the spacers are provided with windows in their projecting ends, the windows in successive spacers in said stack being laterally displaced from each other, and in which said other reciprocable means is provided with two laterally spaced window engaging members, each aligned with the windows in alternate spacers in said stack, whereby simultaneous engagement between the engaging means on said other reciprocable means with the window of more than the front spacer is prevented.

10. In a magazine camera back for cut-film, a frame for supporting a stack of cut-film comprising side walls spaced apart to loosely receive the films and having a front wall containing an exposure window of slightly smaller dimensions than the films, means for compressing a stack of films within said frame against said front wall, said frame also comprising a first end wall having a film discharge aperture therein and a second opposite end wall having a spacer discharge passage therein, a spacer magazine beyond said spacer discharge passage, a plurality of spacers of thin, opaque material adapted to be located between successive films in said stack, said spacers being longer than said films and projecting beyond said films into said spacer discharge passage, forwardly inclined tracks extending from said spacer discharge passage to said front wall at points in front of the ends of the spacers in the stack but short of the ends of the films in the stack, for spacing the end of the front spacer in the stack rearwardly from the plane of the front film in the stack, a reciprocable film discharge arm mounted for movement parallel to and substantially in the plane of the front film in said stack, the path of said arm being in front of the displaced end of the front spacer in the stack whereby said arm cannot intercept said spacer, reciprocable actuating means for shifting said film discharge arm to push the front film of said stack through said film discharge aperture in response to movement in one direction and means responsive to movement of said actuating means in the opposite direction for engaging with and shifting the front spacer of said stack out through said spacer discharge passage along said inclined tracks into the spacer magazine.

11. A camera back as described in claim 10 in which said inclined tracks extend from said stack first rearwardly through said discharge passage at an angle to the said front wall and then parallel to but spaced rearwardly from said front wall within said spacer magazine, and in which spring means is provided for forcing spacers carried onto the parallel portion of said tracks into parallel position thereagainst, the length of the parallel portion of said tracks being less than the length of a spacer whereby the ends of spacers discharged into said magazine overhang the inclined portion of said track to facilitate entry of the next spacer between front spacer in said magazine and the supporting tracks.

12. In a magazine camera back for cut-film, means for supporting a stack of films and film spacers with the front of said stack in the focal plane of a camera, said means including a front wall having a window therein, the edges of which window support the front film against forward movement, a spring means for compressing said stack against said front wall, spacer elements for insertion between successive films in said stack, each comprising a sheet of thin, flexible, opaque material of length greater than the films, means for guiding said films and spacers in said stack whereby said spacers project at one end beyond said films, said spacers having windows in their projecting ends, reciprocable actuating means, means attached to and movable with said actuating means for shifting the front film of said stack transversely away therefrom in response to movement of the actuating means in one direction, and means for shifting the front spacer from said stack transversely away from the stack in the opposite direction in response to return movement of said actuating member, said last means comprising a carriage mounted for transverse movement substantially in the plane of said front wall, and a spring clip having a cleft end secured to said carriage for engaging with the edge of the window in the front spacer of said stack and pulling said spacer clear of said stack in response to reciprocation of said carriage.

13. A camera back as described in claim 12 in which front rails are provided for guiding the spacers from said stack to a position therebeyond, said rails being spaced apart on opposite sides of said carriage and extending rearwardly at an angle to said front wall and then parallel to but spaced rearwardly from said front wall, in which spring means are provided for retaining spacers moved on to the parallel portions of said rails against said rails and in which the said spring clip is freely movable rearwardly to maintain driving engagement with a spacer moved thereby onto and along the portion of said rails spaced rearwardly from the path of movement of said carriage.

14. In a magazine camera back for cut-film, a frame for supporting a stack of cut-film, comprising side walls spaced apart to loosely receive the films and having a front wall containing an exposure window of slightly smaller dimensions than the films, means for compressing a stack of films interspaced with spacer elements within said frame against said front wall, said frame also comprising a first end wall having a film discharge aperture therein and a second opposite end wall having a spacer discharge passage therein, a spacer magazine beyond said spacer discharge passage, a plurality of spacers of thin, opaque material adapted to be inserted between successive films in said stack, said spacers being longer than said films and projecting beyond said films into said spacer discharge passage, reciprocable means for successively shifting the front films from said stack through said film discharge aperture and the front spacer from said stack into said spacer magazine, tracks for guiding said spacers from said stack into said spacer magazine, said tracks extending from a point on said front wall in front of the ends of spacers in the stack but short of the ends of films in said stack rearwardly at an angle to said front wall into said spacer magazine and extending therebeyond substantially parallel to said front wall, spring means for compressing spacers in said spacer magazine against the parallel portions of said tracks, and partition members for preventing return of spacer elements from said spacer magazine to said stack compartment extending inwardly from the side walls of said spacer discharge aperture, the forward ends of said partition walls lying in front of the extended plane of the parallel portion of said tracks but spaced from the immediately adjacent inclined portions of the tracks, whereby said partitions permit passage of spacers discharged from the front of said stack along said inclined track but intercept the rear edges of spacers held against the parallel portions of said tracks by said spring means, to prevent return movement of spacers deposited in said spacer magazine.

15. In a magazine camera back for cut-film, a frame comprising a front wall having an exposure window therein, means for supporting a stack of films interspaced with spacer elements with the films in registration with said window, said means including a spring back for compressing said stack against said front wall in registration with said window, means for discharging the front film from said stack transversely away therefrom, a carriage reciprocable in a path adjacent and parallel to said front wall for shifting the front spacer from said stack transversely away therefrom in the opposite direction, a pair of tracks for supporting and guiding said spacers during their discharge from said stack, said tracks being inclined rearwardly from said front wall and then extending parallel thereto, means on said reciprocable carriage engageable with the front spacer in said stack for shifting the spacer along the inclined portions of said track onto the parallel portions thereof, and means secured to said carriage and positioned in advance of the spacer engaging means for rearwardly displacing the spacers previously stacked in said spacer magazine in advance of a new spacer being moved into said magazine along said rearwardly inclined tracks by said spacer engaging means.

16. In a magazine camera back for cut-film, a frame for supporting a stack of cut-film, said frame comprising a front wall containing an exposure window of smaller dimensions than the films for limiting forward movement of said films in said stack, rear spring wall means for compressing a stack of films within said frame against said front wall, means defininig an exposed-film magazine beyond said frame at one end thereof, a plurality of spacers of thin, flexible, opaque material, adapted to be positioned between successive films in said stack, said spacers being longer than the films and projecting beyond the films in the stack at least at said one end, reciprocable means for shifting the front film of said stack into said exposed-film magazine, other reciprocable means for engaging with and shifting the front spacer which overlay said last mentioned film out of said frame in the opposite direction, a carriage slidably mounted within said frame between said stack and film discharge magazine, said carriage having an inwardly extending shelf adjacent its forward edge, and a post secured to said carriage and extending perpendicular to said shelf, apertures in the ends of said spacers for receiving said post, the forward end of said post being spaced from the rear surface of said shelf by substantially the thickness of one spacer, and means operable by said reciprocable means for rearwardly shifting said carriage preliminary to the shifting of said front spacer to deflect said spacer and permit release thereof between the forward end of said post and the rear surface of said shelf, and means for actuating said reciprocable means in timed sequence.

17. In a magazine camera back for cut-film, a frame for supporting a stack of cut-film interspaced with spacer elements of thin, flexible, opaque material longer than said films, whereby the ends of the spacer elements project beyond the ends of the films, said frame comprising a front wall having an exposure window therein registering with the films in said stack, and means for compressing a stack of films in said frame against said front wall, an exposed-film magazine at one end of said frame, a spacer magazine at the other end, reciprocable means for shifting the front film from said stack transversely into said exposed-film magazine, other reciprocable means for shifting the front spacer from said stack into said spacer magazine, and means registering only with the projecting end margin of the front spacer of said stack for rearwardly shifting the front spacer and all the spacers and films back thereof away from said front film during discharge of said front film into said film magazine.

18. In a magazine camera back for cut-film, a frame for supporting a stack of cut-film, said frame comprising front flanges for limiting forward movement of the front film of the stack, rear spring wall means for compressing a stack of film within said frame against said front flanges, means defining an exposed-film magazine beyond said frame at one end thereof, a plurality of spacers of thin, flexible, opaque material adapted to be positioned between successive films in said stack, said spacers being longer than the film and projecting beyond the film in the stack at least said one end, reciprocable means for shifting the front film from said stack into said exposed-film magazine, a carriage slidably mounted for fore and aft movement within said frame between said stack and magazine, said carriage having means thereon for engaging with the projecting end of the front spacer in said stack, means responsive to movement of said reciprocable means for shifting said carriage rearwardly to shift the end of the front spacer in said stack rearwardly and release the advance end of the front film during movement thereof into said magazine, other means also responsive to movement of said reciprocable means for rearwardly displacing the films and spacers in said stack positioned back of said front film at the opposite end whereby substantially all pressure is removed from said front film while the latter is being shifted, other reciprocable means for engaging with and shifting the spacer which overlay the last removed film transversely away from said stack in the opposite direction, and means for actuating said reciprocable means in timed relation.

19. In a magazine camera back for cut-film, means for supporting a stack of cut-film, said means comprising a front wall containing an exposure window of slightly smaller dimensions than the films, spring means for compressing the stack against said front wall, a reciprocable actuating member, means connected to said member for engaging with one edge of and pushing the front film on said stack transversely away from said stack in response to movement of said actuating member in one direction, said stack supporting means comprising a frame having an end wall with a slit therein positioned to receive discharged films as they are pushed transversely from the front of said stack, a discharge film magazine positioned on the opposite side of said end wall having a front wall spaced substantially forward of said slit, said magazine also having rear and side walls forming a light-tight compartment and leaf spring members secured to said rear wall and projecting forwardly therefrom for shifting films discharged into said magazine through said slit forwardly against said front wall of said magazine and clear of said slit.

20. In a magazine camera back for cut-film, means including a light-tight box for containing and supporting a stack of cut-film, said means comprising a front wall containing an exposure window of slightly smaller dimensions than the films, a spring back for compressing the stack against said front wall, a reciprocable actuating member, means connected to said member for engaging with and shifting the front film on said stack transversely away from said stack in response to movement of said actuating member in one direction, said box comprising an end wall having an opening therein through which said front film is shifted, a magazine for receiving films shifted through said opening comprising a detachable container having an opening in one end for receiving a film, removable slide means for sealing said opening in said container, means for detachably supporting said container with respect to said box with the opening in the container juxtaposed to said opening in the end wall of said box and in light-proof engagement therewith, and other means for sealing said opening in said box.

21. In a magazine camera back for cut-film, a front wall member containing an exposure window, means for supporting a stack of cut-film interspaced with thin, flexible, opaque spacer elements in registration against said window, spring means for compressing said stack against said front wall, said stack supporting means comprising side, end and rear walls, a slit in one end wall at its forward edge for the discharge of exposed films, a film magazine beyond said end wall having a front wall positioned forward of said slit, spring means in said magazine for compressing films inserted therein against said front wall, a gate mounted adjacent said end wall for covering said slit, said gate being slidable rearwardly along said end wall to uncover said slit, forwardly inclined guide elements projecting from the lower edge of said gate for deflecting a film pushed thereunder forwardly into said film magazine, and recesses in said front wall in front of said gate for receiving said guides when said gate is in forward position closing said slit.

22. In a magazine camera back for cut-film, means for supporting a stack of cut films interspaced with thin, flexible, opaque spacers, said means comprising a front wall containing an exposure window of slightly smaller dimensions than the films, spring means for compressing the stack against said front wall in registry with said window, a reciprocable actuating member, means connected to said member for engaging with and shifting the front film on said stack transversely away from said stack in response to movement of said actuating member in one direction, said means for engaging with and shifting said front film comprising a pusher arm for engaging with the trailing edge of the front film and mounted for longitudinal movement back of said front wall, whereby it crosses said exposure window during its film discharging movement, other means also connected to said actuating member for shifting the spacer that overlay said last mentioned film transversely away from said stack in the opposite direction during return movement of said actuating member, said actuating member during its return movement moving said spacer shifting means and said pusher arm simultaneously, whereby said spacer overlies said pusher arm during the entire return movement of the arm to prevent contact between said pusher arm and the next film in the stack back of said spacer.

23. In a magazine camera for cut-film, means for supporting a stack of films interspaced with spacer elements with the front film of the stack in the focal plane of the camera, a magazine for exposed-films on one side of said stack-supporting means, a magazine for used spacer elements on the opposite side of said stack-supporting means, a wall in front of said stack-supporting means defining an exposure window, a shutter curtain having an exposure slit therein, said curtain being positioned in front of said wall, spring means for shifting said curtain to bring the slit therein to one side of said window, a reciprocable camera actuating member, curtain setting means comprising a reciprocable plate dimensioned to cover said slit when in registry therewith and attached to said actuating member, latch means on said curtain setting means for engaging said curtain when said plate is moved into registration with said slit on said one side of said window, means for releasing said latch in response to movement of said plate to a point beyond the other side of said window, means connected to said actuating member for discharging the front film on said stack into said exposed film magazine in response to movement of said actuating member in a direction to bring said plate into registration with said curtain slit on said one side of said window, and means also connected to said actuating member to discharge the front spacer from said stack into said used spacer magazine during reverse movement of said actuating member, whereby movement of said actuating member in one direction discharges the front film from said stack and succeeding movement in the opposite direction simultaneously discharges the front spacer from said stack to uncover another film, sets the shutter curtain without fogging the newly uncovered film by shifting the curtain against the tension of its spring while blocking the slit therein with said slit cover plate and thereafter releases the latch to permit the spring to retract the slitted curtain across said exposure window.

24. In a magazine camera, means for supporting a film in exposure position in the camera, a reciprocable actuating member for shifting said film laterally out of said exposure position in response to movement in one direction and bringing a new film into exposure position in response to movement in the opposite direction, a spring actuated shutter curtain mounted in front of films in said exposure position, said curtain having an exposure slit therein, means reciprocable with the said actuating member and comprising a latch for engaging said curtain and also comprising a slit cover plate for covering said slit, for setting said curtain while blocking the slit therein during movement of said actuating member in said opposite direction, and latch release means for releasing said curtain at completion of movement of said actuating member in said opposite direction.

25. A magazine camera back as described in claim 8 in which the spacers are provided with niches in the front faces of their projecting ends and in which the said cooperating means on said other reciprocable means comprises a rearwardly extending spring member adapted to enter the niche in the front spacer and engage the edge of the niche during movement of said other reciprocable means from said point in front of said stack into said spacer magazine.

THOR LAURITZ.